Patented Aug. 16, 1927.

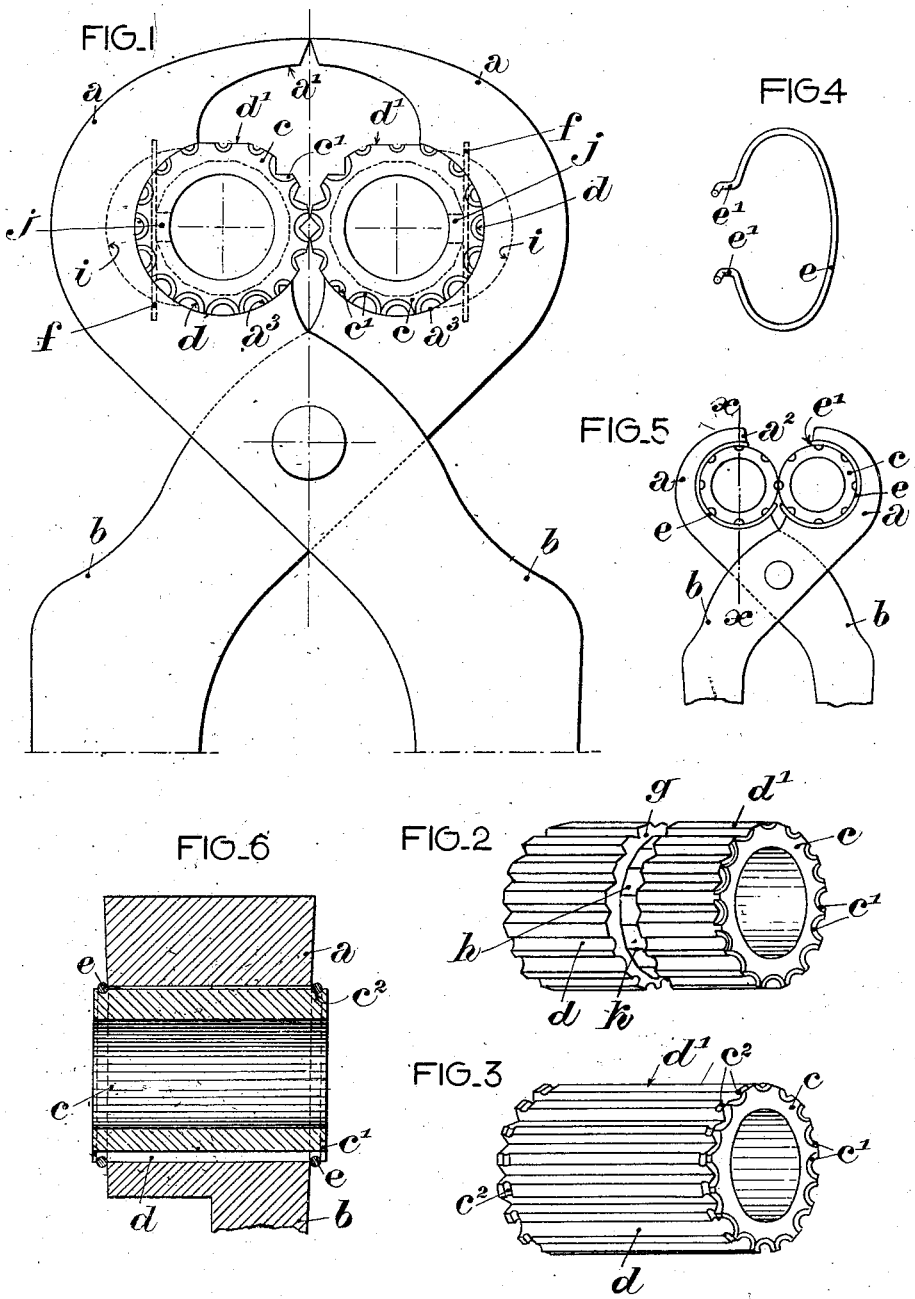

1,639,289

UNITED STATES PATENT OFFICE.

HENRY WILLIAM HAEGLER, OF LYON, FRANCE.

NAIL AND LIKE STRAIGHTENING DEVICE.

Application filed August 12, 1922, Serial No. 581,424, and in Germany March 29, 1922.

This invention relates to a device for straightening nails and the like and of the kind in which two fluted rollers are held in operating jaws whereby they can be pressed together, the rollers being adjustable about their axes so that grooves of different dimensions can be turned into operative position in accordance with the thickness of the nails under treatment.

According to the present invention the rollers are supported direct in the jaws in cylindrical recesses into which they are admitted axially.

This arrangement has the advantage that the rollers can be easily exchanged in case of need; that they can extend beyond the jaws and be used for levelling the nail head after the nail has been straightened; that they can be made tubular so as to be light and so as to admit the limbs of staples for straightening; and that the device as a whole will be simple, easy and cheap to manufacture. As the rollers project beyond the jaws, moreover, a nail can be held with the fingers close to the ends of the rollers without coming into conflict with the jaws. The rollers can be made sufficiently long without making the tool, for instance if it consists of a pair of tongs, impracticably large and clumsy. If the tool is also used as a nail extractor, and if long nails are to be dealt with, the rollers can easily be removed from the jaws to make room for the nail. Finally, as the rollers fill up the jaw recesses entirely, there will be no room around them for the collection of dirt which might interfere with their rotary adjustment.

Fig. 1 of the drawings represents a side view of the device, in this instance a pair of tongs, the handles being omitted;

Fig. 2 is a perspective view of one of the rollers;

Fig. 3 is a view of a roller of modified construction;

Fig. 4, a perspective view of a clip for holding this roller in position;

Fig. 5, a side view on a smaller scale of a device fitted with rollers according to Fig. 3; and Fig. 6, an enlarged section taken on the line $x$—$x$ of Fig. 5.

A pair of cooperating jaws $a$, belonging either to a power machine or to a hand tool, for instance a pair of tongs $b$, are formed with cylindrical recesses $a^3$ capable of admitting axially a pair of rollers $c$ and of supporting such rollers when pressed together by means of the jaws. On the circumference of the rollers longitudinal grooves $d$ are provided of different dimension and cross-section for the reception of different sizes of nails, wires and the like, such articles being placed in the grooves between the two rollers and straightened by pressing the jaws together. There is also a flat portion $d^1$ on each roller for straightening and flattening metal strips and sheets. The spaces $c^1$ near to and around the grooves at one or both ends of the rollers are chamfered so as to form a recess for the nail heads. In order to level the head after a nail has been straightened, it is either pressed or hammered into the recess $c^1$ while the nail remains pressed between the rollers. The rollers are extended beyond the jaws to facilitate this operation.

The rollers are turned round within the jaws for bringing the desired grooves into register. These grooves need not necessarily be alike. For a nail of triangular or D-shaped cross-section, for instance, one of the semi-circular or triangular grooves and one of the flat surfaces $d^1$ may be used.

The rollers are hollow, i. e., tube-shaped, partly for the purpose of reducing the weight, and partly to allow U-shaped staples to span the roller wall for the straightening of their limbs.

To hold the rollers in adjusted position, a spring $f$ is arranged in each jaw $a$ opposite the circumferential groove $g$ in the roller. Flat surfaces $h$ are milled into the bottom of the groove for determining the position of the various grooves in cooperation with the spring $f$ which yields to let the corners $k$ pass when the roller is adjusted. The adjustment is easily effected by hand. By its engagement with the groove $g$, the spring $f$ also prevents axial displacement of the roller. To permit the release of the roller when a removal of the same is desired, a slot $j$ is provided in the roller wall through which a suitable tool may be inserted for forcing the spring out of the groove $g$, a recess $i$ being made in the jaw $a$ to receive it. Thus the rollers can easily be exchanged when a single pair is not sufficient for dealing with the entire range of nail sizes and shapes.

If the rollers are fitted into a pair of tongs, the jaws $a$ of the latter can be adapted for the extraction of nails as well as for the straightening of the same, as shown in Fig. 1. The nipping parts of the jaws are hollowed or bevelled off at $a^1$ towards the recesses $a^3$ so as to leave a fairly large space for admitting the extracted nail. For the same purpose the rollers are placed as far away from the nipping points and as near to the jaw fulcrum as possible, an arrangement which has the additional advantage that a considerable leverage is obtained for the straightening of the nails. When extracted nails are still too long to clear the rollers, the latter may be removed from the tongs.

If the tool is not intended to be used for the extraction of nails, the jaws may be formed with blunt points $a^2$ as shown in Fig. 5. This figure and Figs. 3, 4 and 6 also show a modified device for keeping the rollers $c$ in position. Such device comprises an open-ended ring $e$ which is accommodated in a circumferental groove $c^2$ at the end of the roller and which bears against the side of the jaw $a$. There is one ring at each end of the roller so that the latter is unable to move axially in either direction. The ends of the ring are bent twice, first at right angles to the ring and then radially outwards. The first portion of the bend is adapted to snap into one of the grooves $d$ of the roller so as to lock the latter to the ring, and the last or radial portion $e^1$ of the bend is adapted to engage the jaws $a$ so as to lock the ring to the latter. Thus the two rings at the ends of the roller will prevent displacement in all directions. The rings yield to forcible rotary adjustment of the roller for bringing the various grooves into operative position. They can also be easily detached for the removal of the roller.

I claim:—

1. A device of the character described comprising a pair of fluted rollers, a pair of operating jaws having cylindrical recesses extending throughout said jaws into which said rollers can be admitted from both sides and in which they can be supported for pressing the rollers to articles inserted between them, and means for retaining the rollers in their respective jaws in various positions of rotary adjustment.

2. A device of the character described comprising a pair of fluted tubular rollers, a pair of operating jaws having cylindrical recesses extending throughout said jaws into which said rollers can be admitted from both sides and in which they can be supported for pressing the rollers to articles inserted between them, and means for retaining the rollers in their respective jaws against axial displacement and in various positions of rotary adjustment.

3. A device of the character described comprising a pair of tubular rollers having outside longitudinal grooves of different dimensions and cross-sections so as to accommodate different shapes of nails, a pair of operating jaws having cylindrical recesses into which said rollers can be admitted axially and in which they can be supported for pressing the nails between them, the spaces around the grooves at the ends of the rollers being recessed to accommodate the nail heads so that the latter can be levelled by being forced into the recesses while the nail is held between the rollers, and means for retaining the rollers in their respective jaws against axial displacement in various positions of rotary adjustment, substantially as and for the purpose set forth.

4. A device of the character described comprising a pair of tubular rollers, a pair of operating jaws having cylindrical recesses into which said rollers can be admitted axially and in which they can be supported for pressing the articles within them, the rollers being provided with outside longitudinal grooves for the accommodation of nails and with flat surfaces for the accommodation of plates, and means for retaining the rollers in their respective jaws against axial displacement and in various positions of rotary adjustment, substantially as and for the purpose set forth.

5. A device of the character described comprising a pair of tubular rollers, a pair of operating jaws having cylindrical recesses into which said rollers can be admitted axially and in which they can be supported for pressing the articles between them, the rollers being provided with outside longitudinal grooves of different dimensions and cross-sections for accommodating nails of different shapes and with flat surfaces for accommodating plates, each roller having a circumferential groove whose bottom consists of a plurality of straight cuts, a spring connected to the operating jaw so as to engage said slot and bear against the straight contours so as to retain the roller positively against axial and yieldingly against rotary displacement, the roller having a slot through which the spring can be actuated for releasing it from the groove, substantially as and for the purpose set forth.

6. A device of the character described comprising a pair of operating jaws adapted to support elements, a pair of grooved elements for pressing the same to articles inserted between them, the spaces around the ends of the grooves being recessed for shaping articles at an angle to the axes of the grooves, and means for retaining the elements in their respective jaws.

7. A device of the character described comprising a pair of fluted rollers having a circumferential groove, a pair of operating jaws having recesses in which said rollers can be supported for pressing the same to articles inserted between them, a spring connected to the operating jaws to engage said groove for retaining the rollers positively against axial displacement, the rollers having a slot through which the spring can be actuated for releasing it from the groove.

8. A device of the character described comprising a pair of elements having grooves, a pair of operating jaws in which said elements can move and in which they are supported for pressing the same to articles inserted between them, means for retaining the elements in their respective jaws and means automatically operative for insuring the accurate registering of the grooves.

9. A device of the character described comprising a pair of fluted elements, a pair of operating jaws in which said elements can rotate and move axially and in which they are supported for pressing articles inserted between them, means for locking the elements with their respective jaws against axial displacement, means for the release of said lock and means for retaining yieldingly the elements against rotary displacement.

10. A device of the character described comprising a pair of rollers having co-operating pressing surfaces, a pair of operating jaws having recesses extending throughout said jaws into which said rollers can be admitted from both sides and in which they can be supported for pressing the rollers to articles inserted between them, and means for retaining the rollers in their respective jaws.

11. A device of the character described comprising a pair of elements having co-operating pressing surfaces, a pair of operating jaws in which said elements can move and in which they are supported for pressing the same to articles inserted between them, means simultaneously operative for retaining the elements in their respective jaws and for retaining yieldingly said elements against displacement in said jaws and for insuring the accurate registering of the co-operating pressing surfaces.

12. A device of the character described comprising a pair of rollers having co-operating pressing surfaces, a pair of operating jaws in which they are supported for pressing said elements to articles inserted between them, and keys at a tangent to the periphery of the rollers for retaining the same in their respective jaws.

HENRY WILLIAM HAEGLER.